US008954360B2

(12) United States Patent
Heidasch et al.

(10) Patent No.: US 8,954,360 B2
(45) Date of Patent: Feb. 10, 2015

(54) SEMANTIC REQUEST NORMALIZER

(71) Applicants: SAP SE, Walldorf (DE); intelligent views GmbH, Darmstadt (DE)

(72) Inventors: Robert Heidasch, Speyer (DE); Stefan Scheidl, Dieburg (DE); Michael Neumann, Speyer (DE); Matthias Kaiser, Walldorf (DE); Christian Lahmer, Heidelberg-Rohrback (DE); Stephan Brand, Wiesloch (GH); Nico Licht, Heidelberg (GL); Klaus Reichenberger, Frankfurt (DE); Steffen Moldaner, Riedstadt (DE)

(73) Assignees: SAP SE, Walldorf (DE); intelligent views GmbH, Darmstadt (DE)

( * ) Notice: Subject to any disclaimer, the term of this patent is extended or adjusted under 35 U.S.C. 154(b) by 167 days.

(21) Appl. No.: 13/653,086

(22) Filed: Oct. 16, 2012

(65) Prior Publication Data

US 2014/0108304 A1 Apr. 17, 2014

(51) Int. Cl.
*G06F 15/18* (2006.01)
(52) U.S. Cl.
USPC ............................................................. 706/12
(58) Field of Classification Search
None
See application file for complete search history.

(56) References Cited

U.S. PATENT DOCUMENTS

| 7,774,404 | B2 * | 8/2010 | Heidasch | 709/201 |
|---|---|---|---|---|
| 8,156,473 | B2 * | 4/2012 | Heidasch | 717/124 |
| 8,205,120 | B2 * | 6/2012 | Heidasch et al. | 714/45 |
| 8,239,839 | B2 * | 8/2012 | Rossmann et al. | 717/129 |
| 8,335,314 | B2 * | 12/2012 | Heidasch | 380/35 |
| 8,527,451 | B2 * | 9/2013 | Heidasch | 706/55 |
| 8,725,760 | B2 * | 5/2014 | Heidasch | 707/769 |
| 8,731,998 | B2 * | 5/2014 | Heidasch | 705/7.38 |
| 8,762,384 | B2 * | 6/2014 | Heidasch | 707/741 |
| 8,769,502 | B2 * | 7/2014 | Heidasch et al. | 717/129 |
| 8,798,969 | B2 * | 8/2014 | Heidasch | 703/2 |
| 2014/0108304 | A1 * | 4/2014 | Heidasch | 706/12 |
| 2014/0108313 | A1 * | 4/2014 | Heidasch | 706/20 |

OTHER PUBLICATIONS

Energy-efficient design of real-time stream mining systems, Shaolei Ren ; Cuiling Lan ; van der Schaar, M. Acoustics, Speech and Signal Processing (ICASSP), 2013 IEEE International Conference on DOI: 10.1109/ICASSP.2013.6638327 Publication Year: 2013 , pp. 3592-3596.*

(Continued)

*Primary Examiner* — Michael B Holmes
(74) *Attorney, Agent, or Firm* — Schwegman Lundberg & Woessner, P.A.

(57) ABSTRACT

A cascading learning system as a normalized semantic search is described. The cascading learning system has a request analyzer, a request dispatcher and classifier, a search module, a terminology manager, and a cluster manager. The request analyzer receives a request for search terms from a client application. The request analyzer has a normalization manager, a semantic parser, and a context builder. The normalization manager normalizes the search terms and generates a normalized semantic request based on a context. The request dispatcher and classifier classifies and dispatches the normalized semantic request to a corresponding domain-specific module that generates a prediction with a trained probability of an expected output. The terminology manager receives the normalized semantic request from the request dispatcher and classifier, and manages terminology stored in a contextual network.

20 Claims, 7 Drawing Sheets

(56) References Cited

OTHER PUBLICATIONS

Bankruptcy Prediction Using Multiple Classifier System with Mutual Information Feature Grouping, Chan, A.P.F. ; Ng, W.W.Y. ; Yeung, D.S. ; Tsang, E.C.C. ; Firth, M. Systems, Man and Cybernetics, 2006. SMC '06. IEEE International Conference on vol. 1 DOI: 10.1109/ICSMC.2006.384494 Publication Year: 2006 , pp. 845-850.*

Predictors of customer perceived software quality, Mockus, A. ; Ping Zhang ; Li, P.L. Software Engineering, 2005. ICSE 2005. Proceedings. 27th International Conference on DOI: 10.1109/ICSE.2005. 1553565 Publication Year: 2005 , pp. 225-233 Cited by: Papers (12) | Patents (1).*

\* cited by examiner

SEMANTIC REQUEST NORMALIZER

FIELD

The present disclosure relates generally to data searches. In an example embodiment, the disclosure relates to optimizing access to enterprise data.

BACKGROUND

Generally, a search engine is a program that is designed to search for information from a variety of sources of data, such as the World Wide Web and File Transfer Protocol (FTP) servers. Many of these conventional search engines are designed to conduct searches based on a matching of keywords. For example, a conventional search engine searches documents for keywords, which are specified by a user, and returns a list of documents where the keywords are found.

However, conventional search engines often do not take into account the semantic meaning of the keywords found in the enterprise data, such as, for example, business objects and business documents. To clarify this discussion, a "business object," as used herein, may include a representation of a business entity, such as an employee or a sales order, in an enterprise system. That is, a business object is a type of entity inside the business layer in an n-layered architecture of object-oriented computer programs. A business object encompasses both the functions (in the form of methods) and the data (in the form of attributes) of this business entity.

When searching, for example, business objects, a typical search engine may simply search the attributes associated with business objects. For example, in response to receiving a query for "employees located in San Diego," the typical search engine may return a business object of a company with a name of "San Diego Surf Shop" because the business object of the company has an attribute containing "San Diego." However, this is not what the user wants because the business record is not an employee, nor is the company even located in San Diego. As a result, many of these conventional search engines are notoriously inaccurate at searching for enterprise data containing keywords with meanings that depend on the context of the attribute.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1:
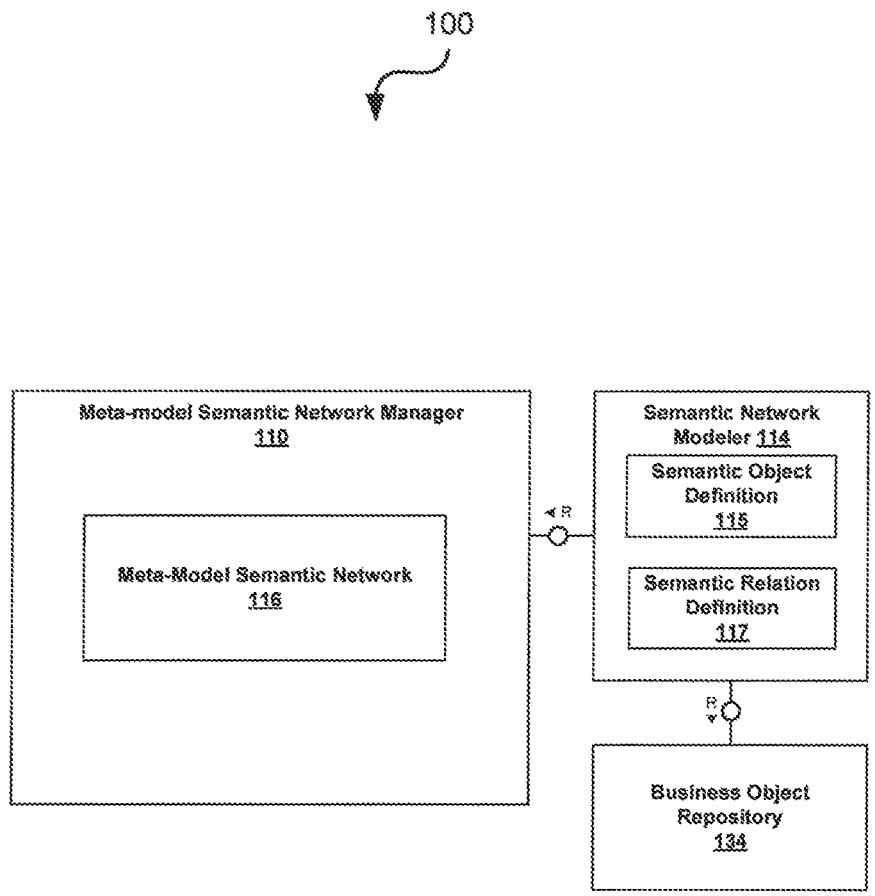
FIG. 1 is a block diagram depicting an architectural overview of a system for determining existing relationships between objects in a meta-model semantic network, in accordance with an example embodiment.

The description that follows includes illustrative systems, methods, techniques, instruction sequences, and computing machine program products that embody illustrative embodiments of the present disclosure. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

Some embodiments describe herein a cascading learning system as a normalized semantic search. The cascading learning system has a request analyzer, a request dispatcher and classifier, a search module, a terminology manager, and a cluster manager. The request analyzer receives a request for search terms from a client application. The request analyzer has a normalization manager, a semantic parser, and a context builder. The normalization manager normalizes the search terms and generates a normalized semantic request based on a context. The request dispatcher and classifier classifies and dispatches the normalized semantic request to a corresponding domain-specific module that generates a prediction with a trained probability of an expected output. The terminology manager receives the normalized semantic request from the request dispatcher and classifier, and manages terminology stored in a contextual network.

Prior to discussing specific example embodiments, further descriptions of some terms are now provided for a better understanding of the descriptions set forth herein.

"Enterprise data," as used herein, may include data maintained by an enterprise, such as a business, individual, group, or any other organization. Examples of enterprise data include, for example, business objects, business documents, notes, bookmarks, annotations, terminology, or any other business concept. In some embodiments, the enterprise data may be extracted from heterogeneous sources (e.g., an email database server and a purchase order database). Further, the enterprise data may be structured (e.g., type defined via a schema, such as extensible markup language (XML)) or unstructured (e.g., word documents).

As used herein, a "semantic network" may include a network of semantic objects connected through semantic relations. A "semantic object," as used herein, may include a conceptual representation of a notion recognized by an enterprise, such as a product, person, employee, customer, business, document, case, project, business object, term, or any other suitable data (e.g., terminology related objects—term, concept, domain, and so forth). A "semantic relation," as used herein, may include a relationship between two or more semantic objects. Such relationships may have attributes and a type or definition that provides a conceptual meaning to how the two or more semantic objects are related to each other.

As used herein, a "meta-model semantic network" may include a semantic network generated based on a meta-model of the enterprise data. A "meta-model," as used herein, is a model that characterizes the conceptual meaning of elements of a business object definition. In turn, a "model" is a characterization of instances of enterprise data. A definition of a business object is an example of a model. The definition may model an instance by defining the attributes (e.g., an address) associated with the business object. The meta-model then models these attributes and gives meaning to them (e.g., an address is a location).

"Semantic information," as used herein, may include information that provides conceptual meaning to enterprise data. Such semantic information may associate particular enterprise data with concepts maintained by an enterprise. For example, a collection of attributes (e.g., street, city, state, zip code, and the like) may be given a meaning of understanding (e.g., location). Such semantic information may be formally organized as "semantic object definitions" and "semantic relation definitions."

The modern business applications access information defined in many systems and business objects (e.g., sources of structured information) and located in many documents (e.g., sources of unstructured information). This information together with business terminology can be reflected in a contextual network—a network which represents semantic objects and relations among them.

Therefore, the presented solution attempts to define a cascading self-learning algorithm/solution that uses the observed system data to look for documents not specified by the end-user but related to what the end-user is looking for. In one embodiment, an additional functionality that is supported by the cascading learning system is related to some calculated business values. A question or an inquiry from an end-user could be dispatched to a module that is trained to respond with some business value to the particular end-user request. In this case, the result or finding is calculated, business-relevant information. Therefore, the output may be defined by the module provider, e.g., how the module is built and what kind of business data is used as training set. The business data may also depend on the architecture.

FIG. 1 is a block diagram depicting an architectural overview of a system for determining existing relationships between objects in a meta-model semantic network, in accordance with an example embodiment. The networked system 100 includes a meta-model semantic network manager 110 that is in communication with a semantic network modeler 114. The meta-model semantic network manager 110 and the semantic network modeler 114 may be embodied, individually or in combination, in a computing device in the form of, for example, a personal computer (PC), a server computer, or any other suitable computing device. In various embodiments, the computing device may be used to implement computer programs, logic, applications, methods, processes, or software to determine existing relationships between objects in a meta-model semantic network using information, as described in more detail below.

The meta-model semantic network manager 110 is designed to maintain the meta-model semantic network 116. As described above, the meta-model semantic network 116 may be a semantic network that includes semantic objects and semantic relations that provide meaning to particular enterprise data, such as, for example, business objects, business documents, notes, bookmarks, annotations, terminology, or any other business concept or enterprise data used within the enterprise. For example, John Smith, as a concept within the enterprise, may be associated with various business objects (e.g., a sales order, employee record, customer record, or any other suitable business object) and with documents created by or otherwise involving John Smith.

The meta-model semantic network manager 110 may also include a contextual network graph generator (not shown) that calculates information of cost and energy between nodes. It also generates a unique identifier for each node and associated edge and stores the unique identifier and the information in a meta-model semantic network database.

As described above, the semantic objects and relations stored in the meta-model semantic network 116 may be based, in part, on semantic object definitions 115 and semantic relation definitions 117. Such semantic definitions may be based on a meta-model of the enterprise data. For example, the semantic network modeler 114 is a modeling tool that uses a meta-modeling based approach to generate a semantic object definition 115 and a semantic relation definition 117. The semantic object definition 115 and the semantic relation definition 117 may extend the definitions of enterprise data (e.g., business objects) at the meta-model level to provide semantic information. Such semantic information provides supplemental meaning to the elements, attributes, and relations between the business objects. As an example, the definition of an employee business object may be associated with an address. In some embodiments, such an address may be a field of the business object, and, in other embodiments, such an address may be represented by a separate business object. In this example, the semantic network modeler 114 may extend the definition of the employee definition, at the meta-model level, to give the address field the semantic meaning of location. That is, the association between the employee and the address characterizes the location of the particular employee.

In some embodiments, to assist an enterprise user in creating the semantic object definition 115 and the semantic relation definition 117, the semantic network modeler 114 may extract existing enterprise definitions stored in a business object repository 134. For example, a source of business object definitions in an SAP environment may be the SAP Enterprise Service Repository (ESR) or the SAP By-Design Model Repository. Once the business object definitions are extracted from the business object repository 134, the semantic network modeler 114 may be configured to provide, for example, a user interface to an enterprise user so that the enterprise user can model such definitions in a way that gives semantic meaning to the business objects.

The semantic network modeler 114 may be configured to send the semantic object definition 115 and the semantic relation definition 117 to the meta-model semantic network manager 110. In turn, the meta-model semantic network manager 110 may generate rule definitions, which are then sent to a text analyzer (not shown). The rule definitions may contain the tokens and expressions with types and meta-data. For example, the rule definitions may include data derived from the semantic network modeler 114. Upon receiving data, the text analyzer uses the rule definitions to determine the terms used in documents and business objects. Analyzed data, in the form of objects and relations, are then sent to the meta-model semantic network manager 110 to be imported in the meta-model semantic network 116.

As described above, the meta-model semantic network 116 may store relations with enterprise data. In some embodiments, the meta-model semantic network manager 110 may receive the enterprise data through the text analyzer. The text analyzer is part of a business extractor (not shown) that is configured to extract enterprise data from enterprise data sources and export objects and relations to the meta-model semantic network manager 110. The text analyzer may extract enterprise data stored by enterprise systems, such as a business object stored by a business application and/or a document stored by a document storage system. The business application and the document storage system are examples of enterprise data sources. As is explained below, data derived from the business object and the document may be obtained through a crawler. Based on the rule definition, the text analyzer communicates objects and relations to the meta-model semantic network manager 110.

The business terminology and the business information may be integrated in the networked system 100, also referred to as contextual network graph.

Elements of the contextual network graph include semantic objects and semantic relations (e.g., relations between particular semantic objects) which allow defining semantically particular business objects, documents, domains, terms, concepts, cases, notes, bookmarks, and the like (e.g., any kind of object that encapsulates some data and/or functionality). The semantic relation is an object defined by a respective meta-model that defines the link type, its importance (e.g., source weight—authority, see below), direction (e.g., simple/bidirectional), and so forth. The semantic relations also define the semantic compound relations, e.g., relation chains that allow finding experts (e.g., those who are working on a particular topic, using particular terminology, etc.), relevant documents (e.g., documents describing a sale of a particular material, etc.), and/or business partners (e.g., to whom supplier offers a material that fulfills conditions, etc.). One aspect of the present embodiment is scalability and performance of the contextual network graph.

With respect to FIG. 1, it should be appreciated that in other embodiments, the networked system 100 may include fewer or more components apart from those shown in FIG. 1. For example, in an alternate embodiment, the semantic network modeler 114 can be integrated within the meta-model semantic network manager 110. The components and respective modules shown in FIG. 1 may be in the form of software that is processed by a processor. In another example, as explained in more detail below, the components and respective modules shown in FIG. 1 may be in the form of firmware that is processed by application specific integrated circuits (ASIC), which may be integrated into a circuit board. Alternatively, the components and respective modules shown in FIG. 1 may be in the form of one or more logic blocks included in a programmable logic device (for example, a field programmable gate array). The components and respective modules shown in FIG. 1 may be adapted, and/or additional structures may be provided, to provide alternative or additional functionalities beyond those specifically discussed in reference to FIG. 1. Examples of such alternative or additional functionalities will be discussed in reference to the flow diagrams discussed below.

Figure 2:
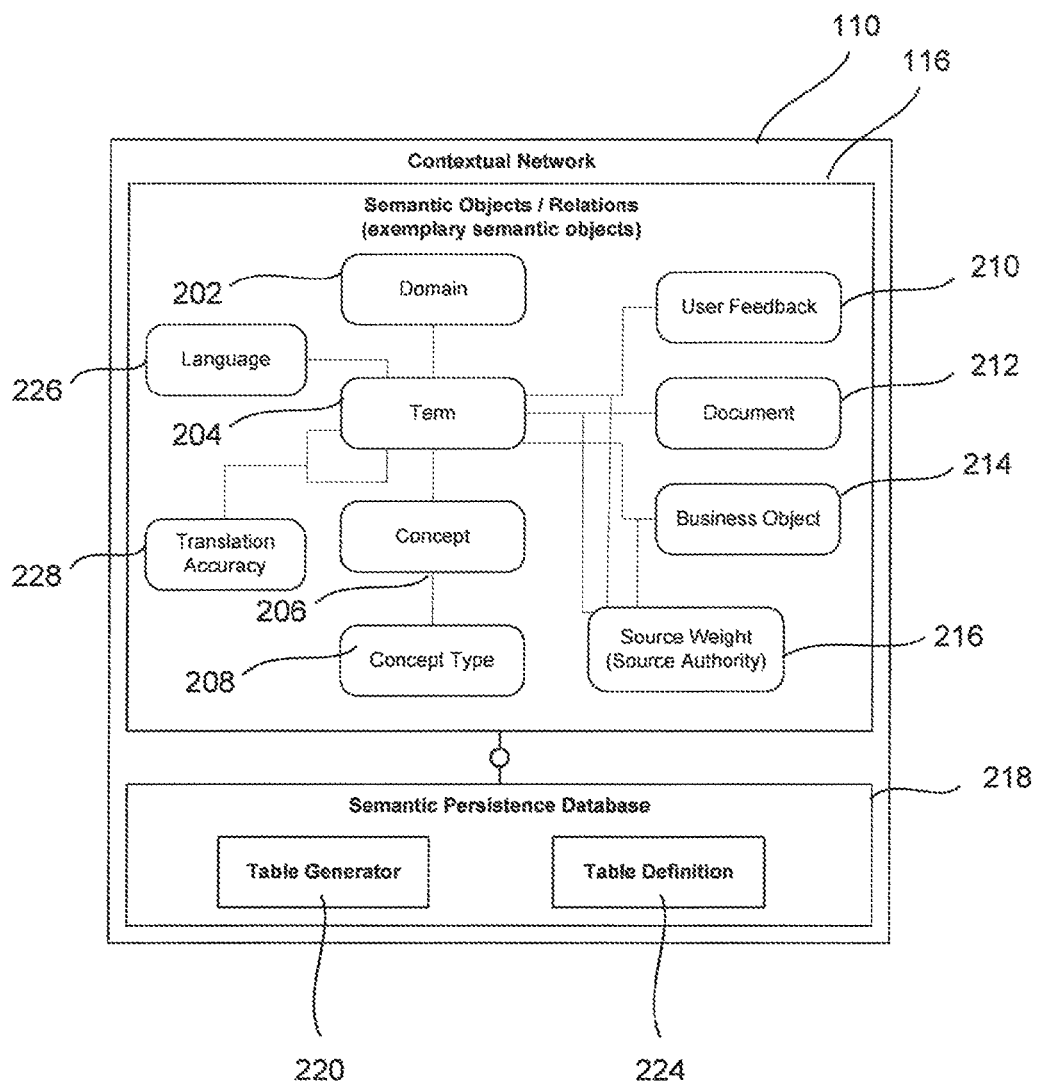
FIG. 2 is a block diagram showing an example of a meta-model semantic network manager.

FIG. 2 is a block diagram showing a meta-model semantic network manager 110, in accordance with an example embodiment. The meta-model semantic network 116 includes nodes that link a term 204 to a domain 202 and a concept 206. In turn, the concept 206 may be linked to a concept type 208. Although FIG. 2 shows the nodes of the meta-model semantic network 116 as single entities, it is to be appreciated that meta-model semantic network 116 may include fewer or more nodes apart from those shown in FIG. 2. For example, a concept may be linked to one or more terms. Still further, additional and different nodes may be utilized by the meta-model semantic network 116.

The term 204 may be a word or phrase found in a business application, a document, the Internet, or manually created by an end-user. The concept 206 may include a unit of meaning to which the term 204 refers, such as a specific idea or notion. The concept 206 groups all of the terms that are used to express this idea as synonyms. For example, a product may be associated with multiple product names. Accordingly, each of the product names may be stored as separate terms in the meta-model semantic network 116 but all linked to the same product concept.

The domain 202 may associate the term 204 with a particular knowledge domain used within an enterprise. A collection of terms associated with a particular domain may then define the vocabulary used to describe concepts in a knowledge domain.

The concept type 208 may be metadata that characterizes the attributes associated with the concept 206. The concept type 208 may, for example, describe the attributes associated with the concept 206 for a particular product.

The meta-model semantic network 116 may also include nodes that relate the term 204 to enterprise data, such as a user feedback object 210, document 212, and business object 214. A user feedback object 210 may be any data embedded into enterprise data to provide further contextual data to the enterprise data. Notes, bookmarks, annotations, or any other user-embedded data are examples of user feedback objects 210.

In some embodiments, the semantic relations between the term 204 and the nodes 210, 212, 214 may be influenced by a source weight 216. The source weight 216 may be a weighting factor that makes some relationships more relevant. In some embodiments, the source weight 216 may indicate that a node is more or less relevant based on the user feedback object 210. In other cases, a document 212 that merely mentions some of the attributes of a concept 206 may receive a lesser weight than a business object 214 that includes the relevant relations and attributes.

The semantic persistence database 218 may store different meta-model semantic networks 116. For example, a first meta-model semantic network may include semantic relations and semantic objects optimized to respond to queries directed to sales orders (e.g., who created a sales order, which suppliers provide a certain part, etc.), while another meta-model semantic network may include semantic relations and semantic objects optimized to respond to queries related to finding experts in a domain.

In one embodiment, the semantic persistence database 218 may include a memory-based database comprising a table generator 220 and a table definition 222. The contextual network graph may use a unique identification of particular nodes and relations/edges. Each relation may contain information about the relations/edges, such as cost (e.g., how near the objects are located in a network graph) and energy (e.g., how often the relation is used).

Because in practice the business-relevant relations between business objects, documents, and business terminology (e.g., terms, concepts, and knowledge domains) are not infinite, the pre-calculation of the node relations (e.g., relation chain) can be reduced to the particular level which has significant influence on the solution performance.

The table generator 220 may generate information from a contextual network graph node with a collection of relation/edge entries that contain the following information:

Source network ID: key of metamodel semantic network where the source object is placed.

Target network ID: key of metamodel semantic network where the end/target object is placed. This information allows handling of parallel networks that may be connected by "shared elements" (e.g., elements that are defined in more networks and build a bridge between networks).

Source object key: key of object where the begin/source object is placed.

Target object key: key of object which is the end/target of a particular relation chain.

Distance chain key: cumulated string representing the relation chain.
Level—relation/chain level: length of the relation chain.
Distance cost
Distance energy The table definition 222 may include the source object key, source network ID, target object key, target network ID, distance chain key, the relation/chain level, the distance cost, and the distance energy. In addition, the table definition 222 may include respective updates for parallel networks. Such configured relation/edge entries allow the determining of chains with a number of relations/edges that is double the level number. For example, if the level is set to 3, then the number of relations/edges included in the determined chain is 6 (e.g., maximum level number).

Each object is identified by a unique identifier (a so-called object UUID—Universally Unique identifier) and supported with a memory-based database. This is because the identifier could be, for example, a 64 bit unique identifier, which fits to the memory model of a memory-based database. Therefore, the present embodiment allows compression in memory of huge data amounts and allows for fast operations. In this case, each object/node and relation/edge may be located in a particular memory area of the memory addresses that can be used in the pointing/assignment mechanism and additionally reused for the hash value determination.

In addition, term 204 may also be linked to language 226 and translation accuracy 228.

Figure 3:
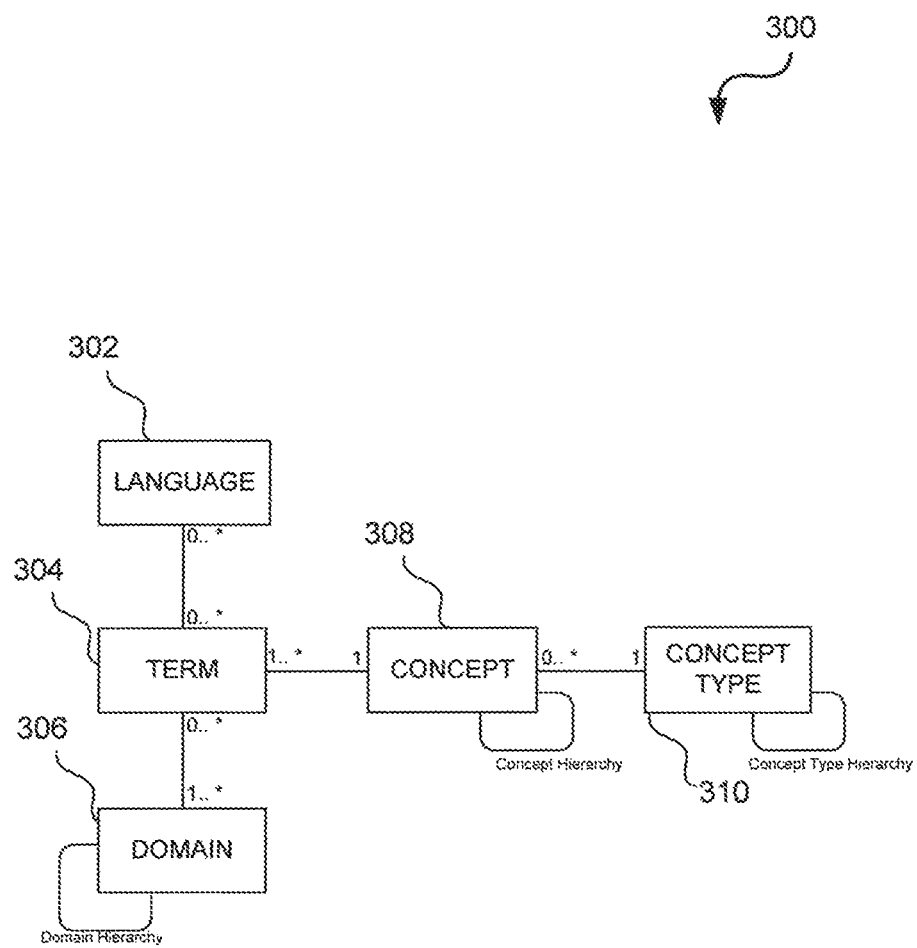
FIG. 3 is a block diagram illustrating terminology of a meta-model semantic network, in accordance with an example embodiment.

As FIG. 3 shows, a semantic network 300 links a term 304 to a language 302, one or more domains 306, and a concept 308. In turn, the concept 308 may be linked to a concept type 310. The links between the various components of the semantic network 300 may define the cardinality of the relationship between the components. For example, the link from the concept 308 to the concept type 310 shows a cardinality of "1," which is to be interpreted as an association with one and only one. Thus, the concept 308 may be linked to one and only one concept type 310. As another example, at the term end of the term-language link, the link shows a cardinality of "0 . . . *." The symbol "*" is to be interpreted as any number. Thus, a language may be linked to zero or many terms.

The term 304 may be a word or phrase found in a business application, a document, the Internet, or manually created by an end-user. The concept 308 may include a unit of meaning to which the term 304 refers, such as a specific idea or notion. The concept 308 groups all the terms that are used to express the specific idea as synonyms. For example, the terms "COLGATE," COLGATE-PALMOLIVE," "C-P," and "CP" may include the concept of the company Colgate-Palmolive. Accordingly, "COLGATE," "COLGATE-PALMOLIVE," "C-P," and "CP" are all synonyms for the Colgate-Palmolive company concept.

The domain 306 may define the knowledge domain or a particular field of knowledge. The domain 306 may group terms used within a particular context. In some cases, the concept 308 related to the term 304 may depend on the domain 306. For example, the meaning of the term Colgate may differ depending on whether the term 304 is used in the domain 306 of toothpaste rather than in the domain 306 of colleges. As FIG. 3 shows, the domain 306 may be associated with a hierarchy of domains.

The language 302 may distinguish the language that the term 304 is used in. For example, the concept 308 that term 304 relates to may depend on the language 302 associated with the term 304. For example, the term "SOY" associated with the language "SPANISH" will be distinguished from the term "SOY" associated with the language "ENGLISH."

The concept type 310 may be metadata that characterizes the attributes associated with the concept 308. The concept type 310 may, for example, describe the attributes associated with the concept "COMPANY," or any other suitable concept 308.

The contextual network illustrated in FIG. 3 is effective when the end-user is looking for documents with specific terms. However, sometimes the end-user is looking for information related to a business document, but has not directly included the terms of the documents in his/her search. For example, the end-user is writing a document (e.g., an error message to SAP) and is looking for a component that may best fit the situation. In another example, the end-user is looking for similar problems in hope that someone had a similar problem and already found the solution involving complex business situations.

The present disclosure describes a self-learning and self-adapting solution for a high performance platform, such as a SAP HANA platform, that uses semantic terminology (e.g., searchable terms) to find and/or calculate the best answers and/or most probable results. The system is also able to integrate different business data source (e.g., document management systems, business applications, and their business objects).

The already existing business data may be initially used as a learning system. This means that after the installation and initialization of the cascading learning system, the end-user obtains the best known information/data. Additionally, the end-user feedback (e.g., the end-user uses the found/calculated information in the next business step) is used to learn the system. In other words, the next end-user profits from previous end-users' actions, and the system provides better information to find the similar documents and solutions. This means that the primary focus is on the learnability and adaptability of the search system, and its integration with SAP HANA platform provider brings additional benefits to its adoption in a customer-specific environment.

Figure 4:
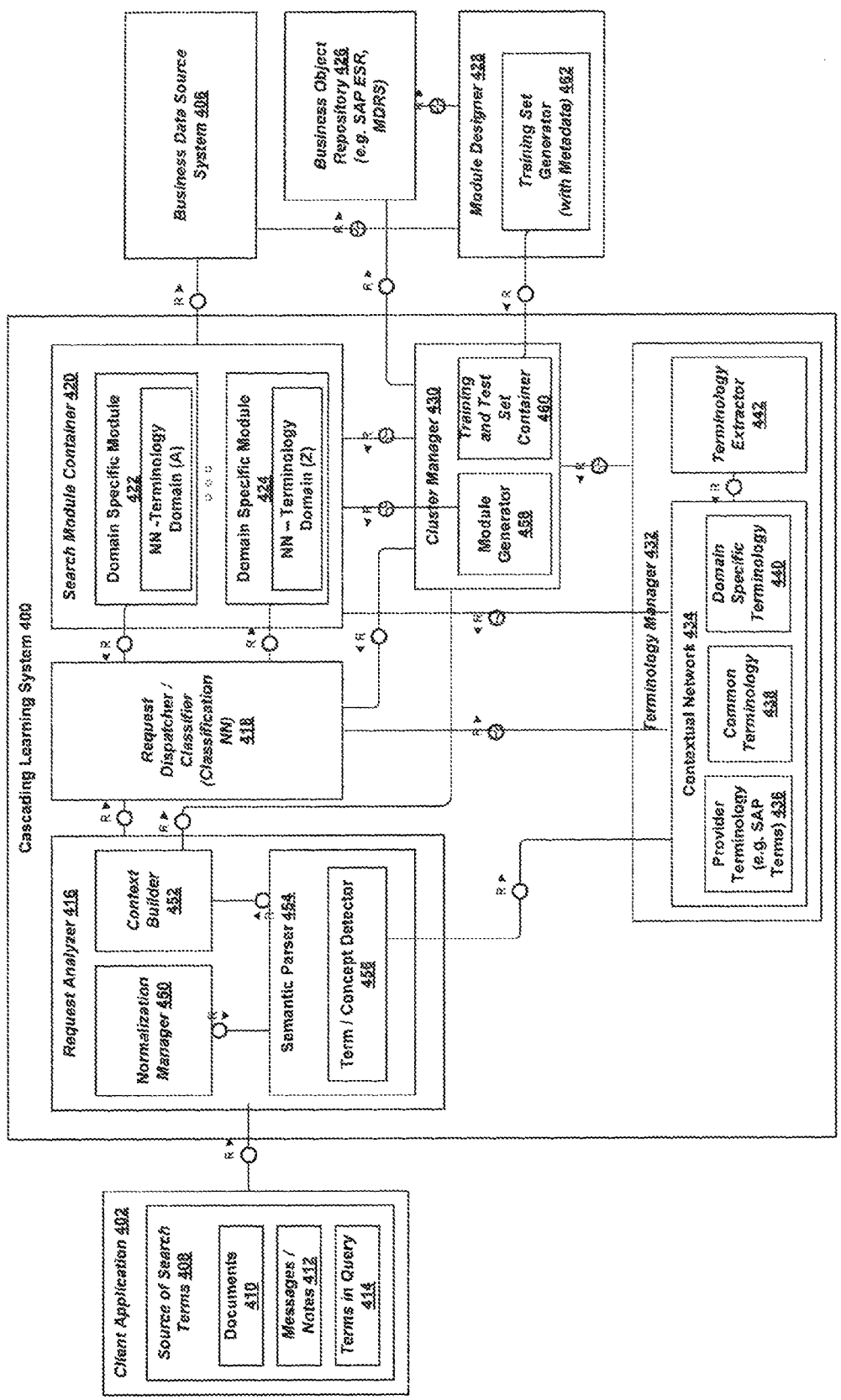
FIG. 4 is a block diagram illustrating an architectural overview of a semantic request normalizer of a cascading learning system, in accordance with an example embodiment.

FIG. 4 is a block diagram illustrating an architectural overview of a cascading learning system 400, in accordance with an example embodiment. The cascading learning system 400 uses learning algorithms to provide information stored in different business object repositories 426 and business applications (also referred to as business data source systems 406). The integration of the cascading learning system 400 with business data source systems 406 is done using domain-specific modules that are highly specialized to provide information (e.g., search for data or calculate data) available for particular business data source systems.

In one embodiment, the cascading learning system 400 includes a request analyzer 416, a request dispatcher and classifier 418, a search module container 420, a terminology manager 432, and a cluster manager 430.

The request analyzer 416 receives a request for search terms from a client application 402. The client application 402 may submit the request based on a source of search terms 408 that includes documents 410, messages and notes 412, and/or terms in query 414. The request analyzer 416 determines term context in the request and normalizes the request from the term context. For example, the request analyzer 416 builds the word/sentence "normal" representation, plural/singular conversion, and so forth.

In one embodiment, the request analyzer 416 includes a normalization manager 450, a context builder 452, and a semantic parser 454.

The normalization manager 450 includes, for example, a linguistic normalizer that creates the unique representation of particular term, e.g., singular form of words, e.g., "book" and "books" are normalized as "book," etc.

The semantic parser 454 supports sentence and word analysis, e.g., finding of named entities, its types, logical structure—NLP, noun-phrase, verb-phrase, etc.) and the near environment (usage of Markov Assumption—near words counts more which is basis of N-gram analysis). All this information (term, named entity and its type and environment data) is used by the term/concept detector 456 to determine the "best" fitting concept. This means the term/concept detector 456 uses the information stored in contextual network 434 which contains parallel networks containing the semantic object/relation models and probability models to determine the concept and its definition.

In one embodiment, the training and test data set is normalized prior to being used to train or learn NN-terminology domain 422, 424. The normalization includes finding the "best" fitting concepts for a particular term and is done using the terminology stored/defined in contextual network 434. This is because the terminology in the customer system could be slightly differently modeled/organized and the training/test set should be "adapter" to the current terminology definition. Otherwise the system is trained with differ data then are used by the "real" end-user request.

The context builder 452 uses the concepts and their definitions and relations to extend the original request. In other words, the context builder 452 consolidates the "original" request data with the "normalized/unified" data.

In an example operation, the request data is passed from normalization manager 450 to semantic parser 454 (which may determine concept, its definition and relations) and to context builder 452. In the next step, the context builder 452 exposes the extended request to the cluster manager 430. The cluster manager 430 uses the "normalized" data to perform the particular processing steps; in other words, the cluster manager 430 passes the "normalized" request data to request dispatcher/classifier 418 (implemented by artificial neural network—ANN) responsible search modules independent of the request format in the cascading learning system 400.

The request dispatcher/classifier 418 classifies the normalized request to a corresponding domain-specific module 422, 424 and dispatches the normalized request data to the corresponding domain-specific module 422, 424. In one embodiment, the request dispatcher/classifier 418 includes an artificial neural network (ANN) that implements a classification algorithm. The request dispatcher/classifier 418 may be trained to use the prepared/normalized request and may dispatch the request to the responsible domain-specific module (one or many). The ANN may also produce additional information that may help provide information.

The search module container 420 includes several domain-specific modules 422, 424, where each domain-specific module 422, 424 may be configured to generate a prediction with a trained probability of an expected output. For example, the search module container 420 supports running many highly-specialized domain-specific modules 422, 424. The domain-specific modules 422, 424 may include feed-forward neural networks (FFNN) that are specialized in providing information (e.g., calculating which document is probably the most interesting for the end-user) and/or calculating response information based on a previously learned calculation function (e.g., net income and a function of gross income, operational costs, taxes paid, etc.). Therefore, the FFNN is a kind of learned searching module that "predicts" the expected output of searched documents and/or calculated information. It should be noted that the probability can be calculated for the particular test set, but may vary for the end-user request.

Therefore, the cascading learning system 400 supports so-called online learning (e.g., the end-user response is taken in to constantly learn the system 400).

The terminology manager 432 receives normalized request data from the request dispatcher/classifier 418, and manages terminology stored in a contextual network 434. In other words, the terminology manager 432 manages the known terminology used in the cascading learning system 400. In one embodiment, the terminology manager 432 consist of contextual network 434 and a terminology extractor 442.

The contextual network 434 contains terminology definitions built using semantic objects and relations as previously described with respect to FIG. 1. The terminology may be grouped by the contextual network 434 in the following categories:

Provider terminology 436: this group includes terminology similar to a business dictionary (e.g., SAP term);

Common terminology 438: this group combines terminology from all knowledge domains; and Domain specific terminology 440: this group includes terminology that is mainly used to provide data in particular domain-specific.

The terminology extractor 442 extracts terminology from particular domain-specific repositories (e.g., business object repository 426, and/or business objects, from business data source system 406).

The cluster manager 430 controls data flow between the request dispatcher/classifier 418, the search module container 420, the terminology manager 432, and business data source system 406. In one embodiment, the cluster manager 430 organizes the structure and cluster (e.g., manages training, validation and test sets for the ANN and FFNN components and controls cluster data flow, e.g., controls input data used in particular modules). The business data source system 406 includes business object repository 426. In one embodiment, the cluster manager 430 allows for pluggable modules via module generator 458 and training and test set container 460 that communicates with an external module designer 428 comprising training set generator 462.

Operation of the Cascading Learning System

Each domain-specific module 422 (DSM) supports the access to data stored or provided in particular business data source systems 406. In one embodiment, the DSM 422 provides training examples which are used by the cluster manager 430 to train the request dispatcher/classifier 418 with training and test sets for the ANN. In another embodiment, the DSM 422 could be trained in a separate step; this means that the DSM 422 may already contain trained FFNN or provide (similar to ANN) training and test sets for the FFNN.

In a second step, the cluster manager 430 initializes the building of the terminology repository including the contextual network 434. In other words, the cluster manager 430 imports the provider terminology 436. The terminology extractor 442 of the terminology manager 432 extracts the terminology from business object repository 426.

In a final step, the terminology manager 432 classifies the terminology into common terminology 438 and domain specific terminology 440. The classification may be used as optimization of the request processing for particular modules (ANN and FFNN elements) and can be calculated using statistical methods.

For example, the classification algorithm may perform statistical calculations using the following indicators:

Significant term indicator (STI)=number of documents containing term/total number of documents, and Domain significant term indicator (DSTI)=number of documents containing term in domain or total number of documents in domain.

The analysis of the indicators and their relations enables the classification of the terms: which term is more significant for a particular domain, which term is commonly used for classification, and which term is irrelevant. Irrelevant terms are, for example, terms that do not help the request dispatcher/classifier 418 (e.g. "is," "are," and "a"). In another embodiment, the terminology manager 432 may support configuration of different probability levels (e.g., high, medium, low) and the administrator may define which level is sufficient to decide where the term is placed.

It should be noted that the training data has to be normalized before training of the module (NN-terminology domain) starts.

How the System Learns from End-User Interactions

The client application 402 creates a request (e.g., document 410, message 412, or search query) that is sent to the cascading learning system 400. The request analyzer 416 is a component that uses the terminology definition and NLP (Natural Language Processing) methods. In other words, the request analyzer 416 analyzes the search request and determines the term context. The request analyzer 416 then prepares the search request to "normalized" data form. The "normalized" data is sent to the request dispatcher/classifier 418, which uses the common terminology 438 and the ANN algorithm to determine the most probable domain-specific module 422, 424 from the search module container 420. In the next step, the "normalized" data is used together with the domain-specific module 422 or 424 to search/calculate (using FFNN) the requisite information (e.g., document, form, etc.).

In one embodiment, the training and test data is normalized before the cluster manager trains/learns the particular NN-terminology domains 422, 424. The normalization is mainly related to extending/replacing the terms with concepts; this means, the concept that describes/encapsulates the term meaning can be used in the request/search processing.

Furthermore, each request data and the observed end-user interaction can be used as a source of training and test sets in learning algorithms. This means that if the information is rated by the end-user, bookmarked, or used in a further business step, the cascading learning system 400 automatically takes all the request information, its "normalized" form, internal classification (ANN), and search/calculation result (FFNN), to build an online training set which is then used as a fine-tuning step.

In one example implementation, the cascading learning system 400 running on the HANA platform of SAP is an open system that may integrate different business applications. The deep integration with contextual network and terminology classification allows for simplification by reducing the amount of terms used and by using significant terms. Another benefit is usage of the concept as an object that represents the meaning; for example, this means "Colgate Palmolive", "Colgate" and "CP" can be term grouped into to one concept that represents the company "Colgate." In this case there information is so far "normalized" that the synonyms are grouped and used in the request processing.

Figure 5:
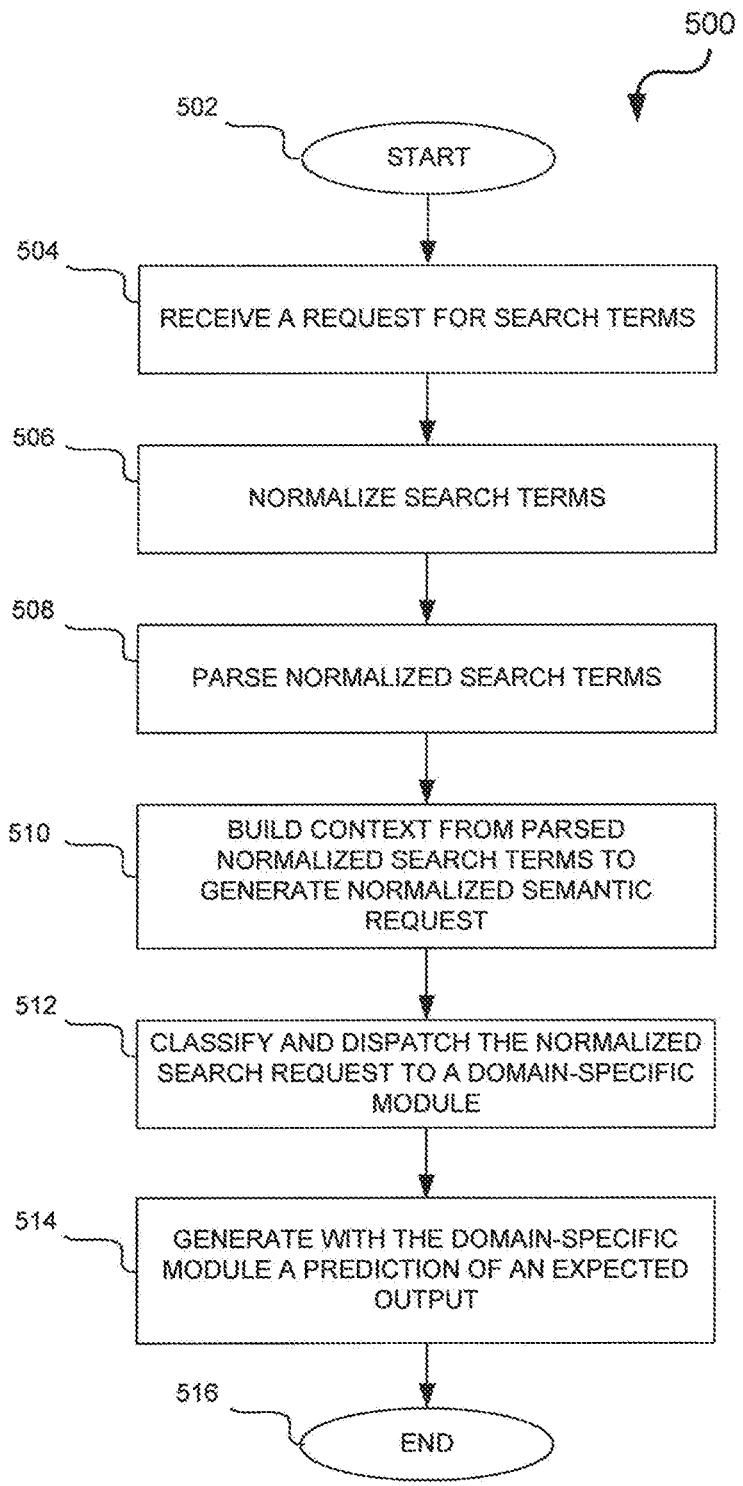
FIG. 5 depicts a flow diagram of a general overview of a method for performing a term search using a cascading learning system as semantic search, in accordance with an example embodiment.

FIG. 5 depicts a flow diagram of a general overview of a method for performing a term search using a cascading learning system as a semantic search. In an example embodiment, the method 500 may be implemented by the cascading learning system 400 of FIG. 4. The method 500 may begin at operation 502.

At operation 504, the request analyzer 416 receives a request for search terms from the client application 402.

At operation 506, the normalization manager 450 normalizes the search terms.

At operation 508, the semantic parser 454 parses the normalized search terms to determine semantic concepts, definitions, and relations using term/concept detector 456.

At operation 510, the context builder 452 builds context to the normalized search terms using the semantic concepts, definitions, and relations and generates a normalized semantic request based on the context.

At operation 512, the request dispatcher/classifier 418 classifies and dispatches the normalized request data to a corresponding domain-specific module 422, 424.

At operation 514, the domain-specific module 422, 424 of the search module container 420 generates a prediction with a trained probability of an expected output. The method 500 then ends at operation 516.

Figure 6:
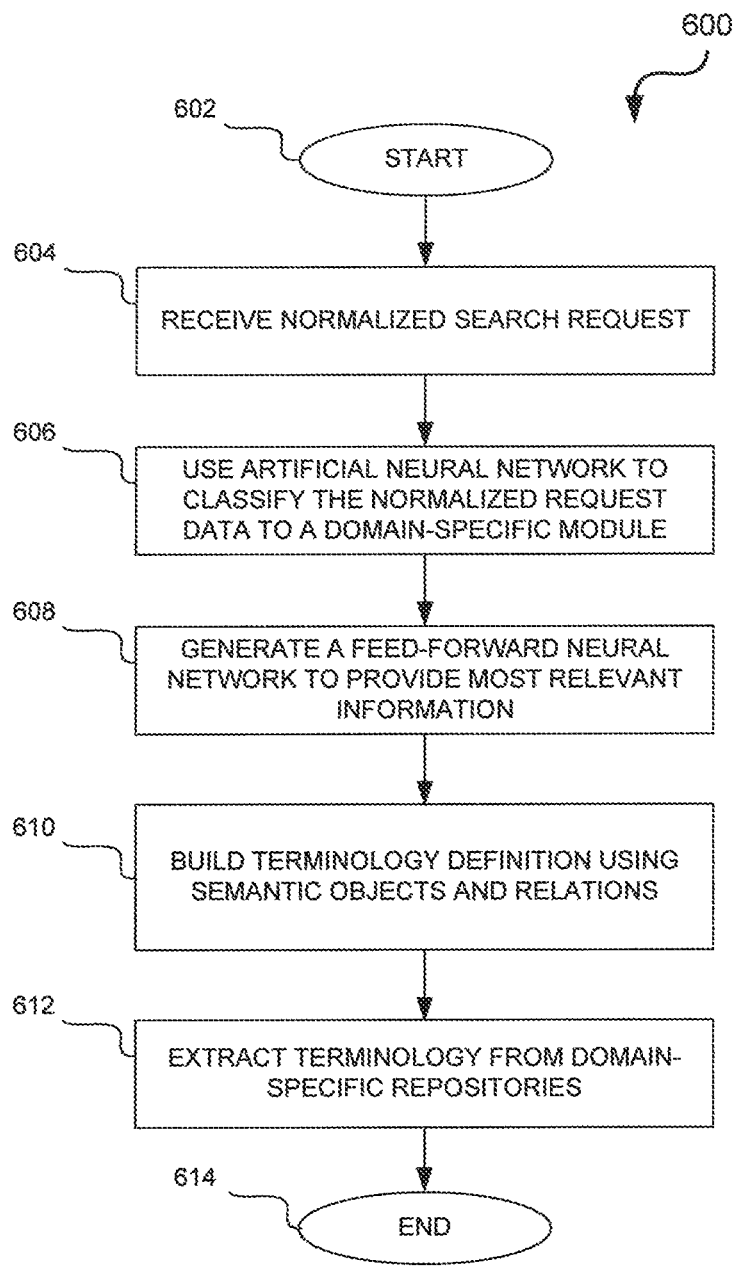
FIG. 6 depicts a flow diagram of a method for classifying search terms, in accordance with another example embodiment.

FIG. 6 depicts a flow diagram of a method 600 for classifying search terms, in accordance with another embodiment. The method 600 may begin at operation 602.

At operation 604, the terminology manager 432 receives normalized request for search terms from the request dispatcher/classifier 418.

At operation 606, an ANN of the request dispatcher/classifier 418 implements a classification algorithm to classify the normalized request data to the corresponding domain-specific module 422, 424.

At operation 608, a FFNN of a domain-specific module 422, 424 specializes in providing information most relevant to the end user of the client application 402.

At operation 610, the contextual network 434 builds terminology definitions using semantic objects and relations as previously described with respect to FIG. 1.

At operation 612, the terminology extractor 442 extracts terminology from particular domain-specific repositories (e.g., business data source systems 406). The method 600 ends at operation 614.

Figure 7:
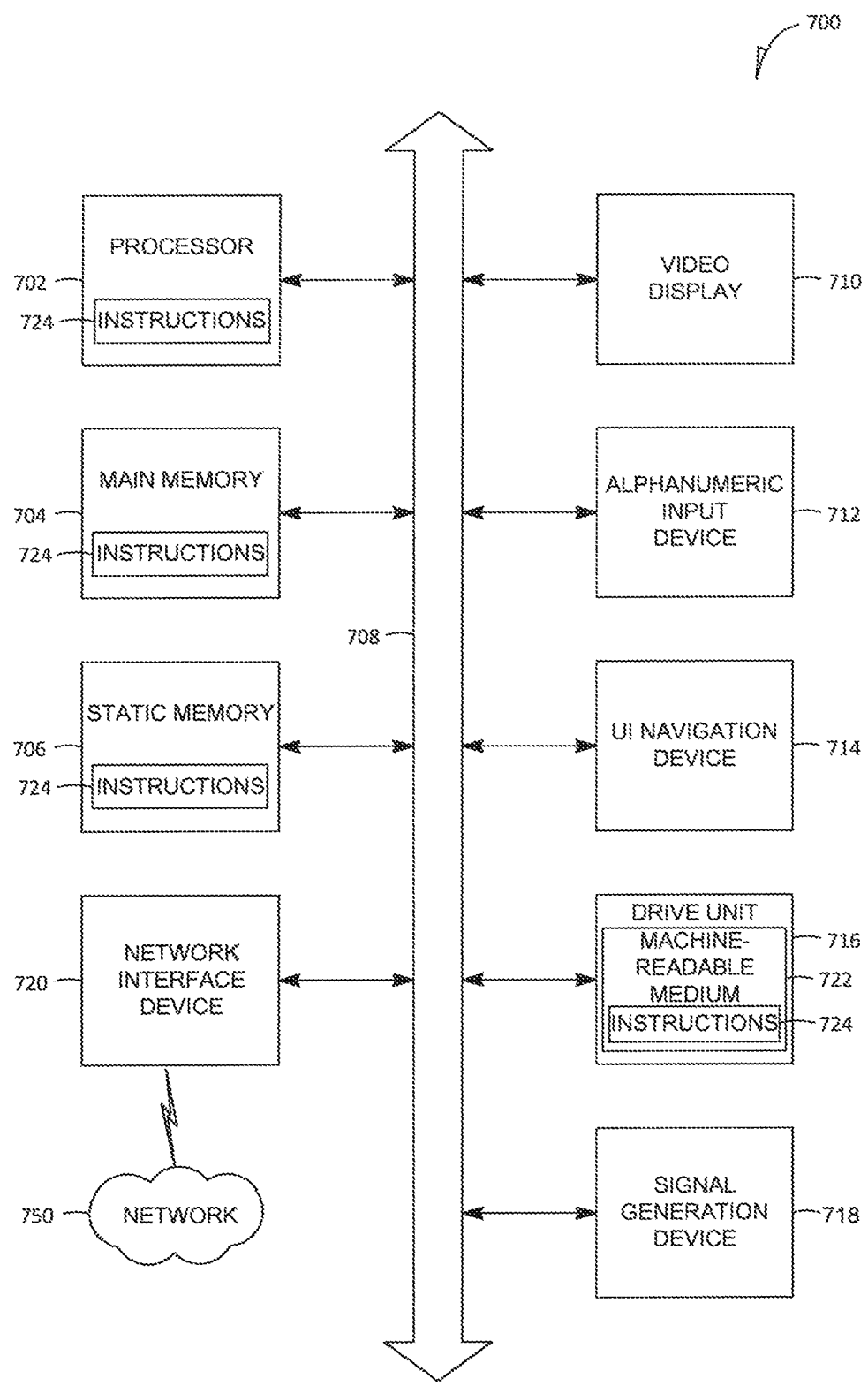
FIG. 7 is a block diagram depicting a machine in the example form of a computing device within which may be executed a set of instructions for causing the machine to perform any one or more of the methodologies discussed herein.

FIG. 7 depicts a block diagram of a machine in the example form of a computing device 700 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 700 includes a processor 702 (e.g., a central processing unit (CPU), a graphics processing unit (GPU) or both), a main memory 704 (e.g., random access memory), and static memory 706 (e.g., static random-access memory), which communicate with each other via bus 708. The computing device 700 may further include video display unit 710 (e.g., a plasma display, a liquid crystal display (LCD) or a cathode ray tube (CRT)). The computing device 700 also includes an alphanumeric input device 712 (e.g., a keyboard), a user interface (UI) navigation device 714 (e.g., a mouse), a disk drive unit 716, a signal generation device 718 (e.g., a speaker), and a network interface device 720.

The disk drive unit 716 (a type of non-volatile memory storage) includes a machine-readable medium 722 on which is stored one or more sets of data structures and instructions 724 (e.g., software) embodying or utilized by any one or more of the methodologies or functions described herein. The data structures and instructions 724 may also reside, completely or at least partially, within the main memory 704, static memory 706, and/or within the processor 702 during execution thereof by computing device 700, with the main memory 704 and processor 702 also constituting machine-readable, tangible media.

The data structures and instructions 724 may further be transmitted or received over a computer network 750 via network interface device 720 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 700) or one or more hardware modules of a computer system (e.g., a processor 702 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or ASIC) to perform certain operations. A hardware module may also comprise programmable logic or circuitry (e.g., as encompassed within a general-purpose processor 702 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 702 configured using software, the general-purpose processor 702 may be configured as respective different hardware modules at different times. Software may accordingly configure a processor 702, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 702 or processor-implemented modules. The performance of certain of the operations may be distributed among the one or more processors 702, not only residing within a single machine, but deployed across a number of machines. In some example embodiments, the processors 702 may be located in a single location (e.g., within a home environment, an office environment, or as a server farm), while in other embodiments the processors 702 may be distributed across a number of locations.

While the embodiment(s) is (are) described with reference to various implementations and exploitations, it will be understood that these embodiments are illustrative and that the scope of the embodiment(s) is not limited to them. In general, techniques for data searches using context information may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A cascading learning system comprising:
a request analyzer configured to receive a request for search terms from a client application, the request analyzer having a normalization manager, a semantic parser, and a context builder, the normalization manager configured to normalize the search terms, the semantic parser configured to parse the normalized search terms to determine semantic concepts, definitions, and relations, the context builder configured to build context into the normalized search terms using the semantic concepts, definitions, and relations and to generate a normalized semantic request based on the context;
a request dispatcher and classifier configured to classify and dispatch the normalized semantic request to a corresponding domain-specific module;
a search module container comprising a plurality of domain-specific modules, each domain-specific module configured to generate a prediction with a trained probability of an expected output;
a terminology manager configured to receive the normalized semantic request from the request dispatcher and classifier, and to manage terminology stored in a contextual network; and
a cluster manager configured to control data flow between the request dispatcher and classifier, the search module container, the terminology manager, and a business data source system.

2. The cascading learning system of claim 1, wherein the normalization manager is configured to generate a singular form of a term from the request for search terms.

3. The cascading learning system of claim 2, wherein the semantic parser is configured to analyze words and sentences in the search terms to determine concepts, definitions, and relations.

4. The cascading learning system of claim 3, wherein the context builder is configured to use the concepts, definitions, and relations to extend the request to include the concepts, definitions, and relations.

5. The cascading learning system of claim 1, wherein sources of the search terms of the client application comprise documents, messages, and terms in queries; and
wherein the business data source system comprises a document management system (DMS) and a business application.

6. The cascading learning system of claim 1, wherein the request dispatcher and classifier comprises an artificial neural network (ANN) configured to implement a classification algorithm to classify the normalized request data to the corresponding domain-specific module.

7. The cascading learning system of claim 6, wherein each domain-specific module includes a feed-forward neural network (FFNN) specialized in providing information most relevant to an end user of the client application.

8. The cascading learning system of claim 7, wherein the FFNN is configured to calculate which document is most relevant for the end user and calculate response information based on previously learned calculation functions.

9. The cascading learning system of claim 1, wherein the terminology manager comprises a contextual network and a terminology extractor, the contextual network comprises terminology definitions built using semantic objects and relations, and the terminology extractor is configured to extract terminology from particular domain-specific repositories.

10. The cascading learning system of claim 9, wherein the contextual network comprises a provider terminology module, a common terminology module, and a domain specific terminology, the provider terminology module comprising terminology provided by a system provider, the common terminology module comprising a combined terminology from all knowledge domains and used by the request dispatcher and classifier to classify the request and dispatch it to the corresponding domain-specific module and domain-specific terminology, the domain-specific terminology comprising terminology that is mainly used to provide data in the corresponding domain-specific module.

11. The cascading learning system of claim 10, wherein the terminology extractor is configured to extract terminology from one or more domain-specific repositories comprising document management systems (DMS), business applications, and business objects.

12. The cascading learning system of claim 1, wherein the cluster manager further comprises a module generator configured to organize data structures and data clusters in the request dispatcher and classifier and the search module container.

13. The cascading learning system of claim 12, wherein the cluster manager further comprises a training and test set container module configured to manage training, validation, and test sets for artificial neural networks (ANN) and feed-forward neural networks (FFNN), and to control cluster data flow of input data used in each domain-specific module.

14. A method comprising:
receiving, at a request analyzer of a cascading learning system of a server, a request for search terms from a client application;
normalizing the search terms with a normalization manager;
parsing the normalized search terms to determine semantic concepts, definitions, and relations with a semantic parser;
building context into the normalized search terms using the semantic concepts, definitions, and relations and generating a normalized semantic request based on the context with a context builder;
classifying and dispatching the normalized semantic request to a corresponding domain-specific module with a request dispatcher and classifier;
generating, at a domain-specific module of a search module container, a prediction with a trained probability of an expected output based on the normalized semantic request;
receiving the normalized semantic request and managing terminology stored in a contextual network of a terminology manager; and
controlling data flow, at a cluster manager, between the request dispatcher and classifier, the search module container, the terminology manager, and a business data source system.

15. The method of claim 14, wherein normalizing further comprises generating a singular form of a term from the request for search terms.

16. The method of claim 15, wherein parsing further comprises analyzing words and sentences in the search terms to determine concepts, definitions, and relations.

17. The method of claim 16, wherein building further comprises using the concepts, definitions, and relations to extend the request to include the concepts, definitions, and relations.

18. The method of claim 14, wherein generating further comprises:
generating a feed-forward neural network (FFNN) specialized in providing information most relevant to an end user of the client application;
calculating which document is most relevant for the end user;
calculating response information based on previously learned calculation functions;
building terminology definitions using semantic objects and relations;
extracting terminology from particular domain-specific repositories;

extracting terminology from one or more domain-specific repositories comprising document management systems (DMS), business applications, and business objects; and organizing data structure and data clusters in the request dispatcher and classifier and the search module container.

19. The method of claim 18, further comprising:

managing training, validation, and test sets for artificial neural networks (ANN) and feed-forward neural networks (FFNN); and controlling cluster data flow of input data used in each domain-specific module.

20. A non-transitory, computer-readable medium that stores instructions, which, when performed by a computer, cause the computer to perform operations comprising:

receiving, at a request analyzer of a cascading learning system of a server, a request for search terms from a client application;

normalizing the search terms with a normalization manager;

parsing the normalized search terms to determine semantic concepts, definitions, and relations with a semantic parser;

building context into the normalized search terms using the semantic concepts, definitions, and relations and generating a normalized semantic request based on the context with a context builder;

classifying and dispatching the normalized semantic request to a corresponding domain-specific module with a request dispatcher and classifier;

generating, at a domain-specific module of a search module container, a prediction with a trained probability of an expected output based on the normalized semantic request;

receiving the normalized semantic request and managing terminology stored in a contextual network of a terminology manager; and controlling data flow, at a cluster manager, between the request dispatcher and classifier, the search module container, the terminology manager, and a business data source system.

* * * * *